(12) United States Patent
Saiki et al.

(10) Patent No.: US 11,975,686 B2
(45) Date of Patent: May 7, 2024

(54) SECURITY SYSTEM

(71) Applicant: DENSO CORPORATION, Kariya (JP)

(72) Inventors: Takashi Saiki, Kariya (JP); Kenichirou Sanji, Kariya (JP)

(73) Assignee: DENSO CORPORATION, Kariya (JP)

( * ) Notice: Subject to any disclaimer, the term of this patent is extended or adjusted under 35 U.S.C. 154(b) by 63 days.

(21) Appl. No.: 17/945,400

(22) Filed: Sep. 15, 2022

(65) Prior Publication Data
US 2023/0016580 A1  Jan. 19, 2023

Related U.S. Application Data

(63) Continuation of application No. PCT/JP2021/003066, filed on Jan. 28, 2021.

(30) Foreign Application Priority Data

Mar. 26, 2020 (JP) .................... 2020-056485

(51) Int. Cl.
*B60R 25/24* (2013.01)
*B60R 25/20* (2013.01)
(Continued)

(52) U.S. Cl.
CPC .......... *B60R 25/24* (2013.01); *B60R 25/2072* (2013.01); *G01S 13/38* (2013.01);
(Continued)

(58) Field of Classification Search
CPC ................ B60R 25/24; B60R 25/2072; B60R 2325/205; G01S 13/38; G01S 13/34;
(Continued)

(56) References Cited

U.S. PATENT DOCUMENTS 10,124,768 B1 *  11/2018  Bocca ................ G07C 9/00309
2014/0327517 A1 *  11/2014  Portet ..................... G07C 9/20
340/5.61

(Continued)

FOREIGN PATENT DOCUMENTS

| JP | 2019083403 A | 5/2019 |
| JP | 2019128341 A | 8/2019 |
| JP | 2019174418 A | 10/2019 |

*Primary Examiner* — Thomas D Alunkal
(74) *Attorney, Agent, or Firm* — Harness, Dickey & Pierce, P.L.C.

(57) ABSTRACT

A security system includes a portable terminal, a communication device communicating with the portable terminal, and a determination unit determining validity of the portable terminal. Phase data acquired from distance measuring radio wave is used to determine validity of communication between the portable terminal and the communication device. The received phase data of the distance measuring radio wave varies according to the distance from a transmission source. When the communication device and the portable terminal are fixed, and the communication device and the portable terminal have transmitted and received distance measuring radio waves having the same specific frequency, vehicle acquisition phase data and terminal acquisition phase data are the same. The determination unit determines, by using this two types of phase data, the validity of communication between the communication device and the portable terminal is determined.

4 Claims, 8 Drawing Sheets

(51) Int. Cl.
  *G01S 13/38* (2006.01)
  *G01S 13/84* (2006.01)
  *G01S 13/88* (2006.01)
  *G07C 9/00* (2020.01)

(52) U.S. Cl.
  CPC ............ *G01S 13/84* (2013.01); *G01S 13/886* (2013.01); *G07C 9/00309* (2013.01); *B60R 2325/205* (2013.01); *G07C 2009/00555* (2013.01); *G07C 2009/00793* (2013.01); *G07C 2209/61* (2013.01); *G07C 2209/63* (2013.01)

(58) Field of Classification Search
  CPC .............. G01S 13/886; G07C 9/00309; G07C 2009/00555; G07C 2009/00793; G07C 2209/61; G07C 2209/63
  See application file for complete search history.

(56) References Cited

U.S. PATENT DOCUMENTS

| | | | |
|---|---|---|---|
| 2019/0005753 A1* | 1/2019 | Leconte | B60R 25/245 |
| 2019/0187262 A1* | 6/2019 | Moe | G01S 13/825 |
| 2019/0227141 A1 | 7/2019 | Nishikawa | |
| 2020/0081088 A1* | 3/2020 | Nishikawa | G01S 1/045 |
| 2020/0088863 A1* | 3/2020 | Ootaka | G01S 11/02 |
| 2020/0120509 A1* | 4/2020 | Stitt | G07C 9/00309 |
| 2021/0356548 A1 | 11/2021 | Nishikawa | |

* cited by examiner

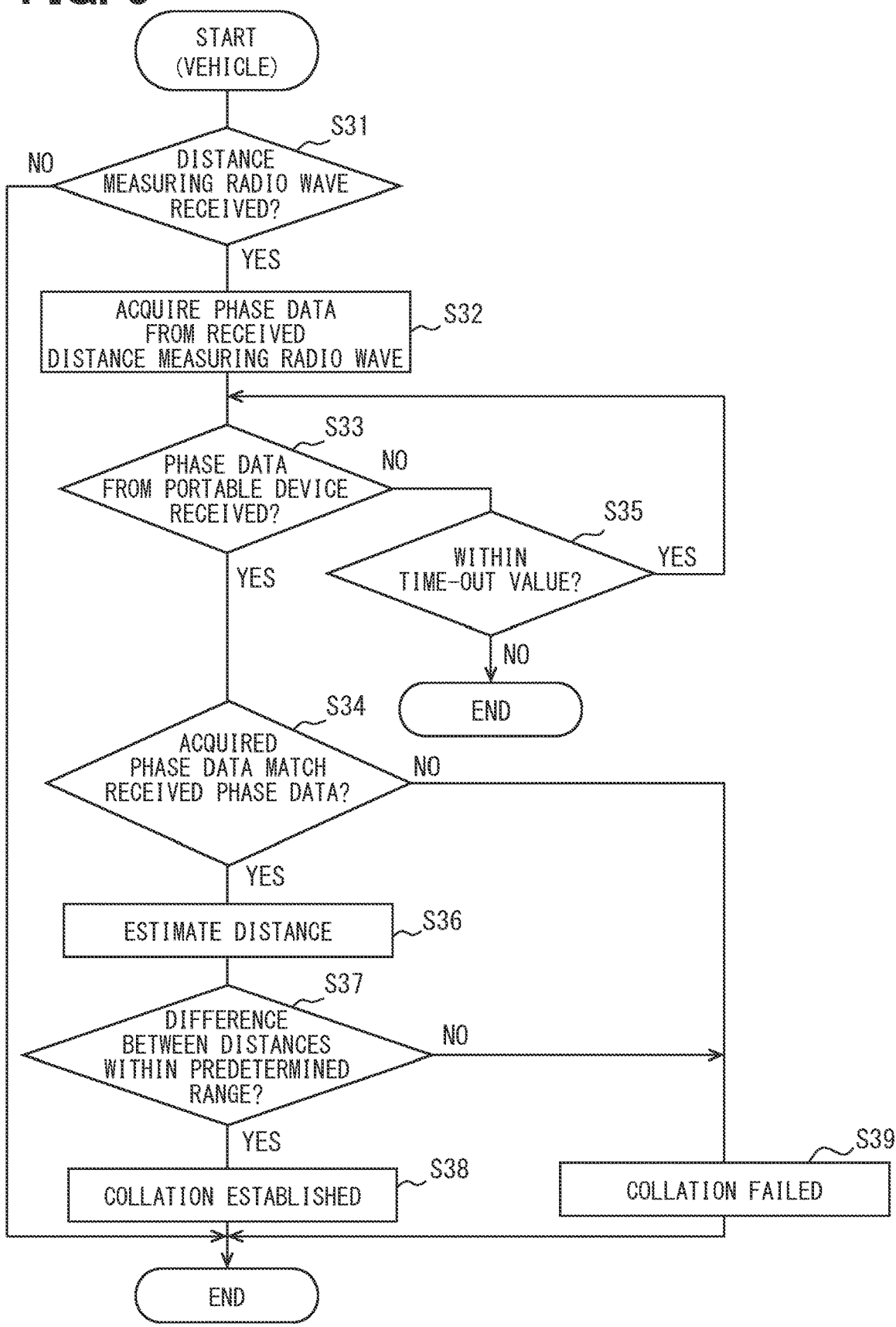

SECURITY SYSTEM

CROSS REFERENCE TO RELATED APPLICATION

The present application is a continuation application of International Patent Application No. PCT/JP2021/003066 filed on Jan. 28, 2021, which designated the U.S. and claims the benefit of priority from Japanese Patent Application No. 2020-056485 filed on Mar. 26, 2020. The entire disclosures of all of the above applications are incorporated herein by reference.

TECHNICAL FIELD

The present disclosure relates to a security system that determines validity of a portable terminal communicating with a communication device.

BACKGROUND ART

Conventionally, a remote keyless entry system (hereinafter referred to as "RKE system") is known as a system for controlling unlocking and locking of a vehicle in a wireless manner.

SUMMARY

The present disclosure discloses a security system including a portable terminal, a communication device communicating with the portable terminal, and a determination unit determining validity of the portable terminal. The portable terminal includes: a terminal communication unit transmitting a distance measuring radio wave for distance measuring purpose at a specific frequency and receiving a distance measuring radio wave transmitted from the communication device at the specific frequency; a terminal control unit controlling the terminal communication unit; and a terminal acquisition unit acquiring phase data from the distance measuring radio wave transmitted from the communication device when the terminal communication unit receives the distance measuring radio wave transmitted from the communication device. The communication device includes: a device communication unit transmitting the distance measuring radio wave at the specific frequency and receiving the distance measuring radio wave at the specific frequency from the portable terminal; a device control unit controlling the device communication unit; and a device acquisition unit acquiring phase data from the distance measuring radio wave transmitted from the portable terminal when the device communication unit receives the distance measuring radio wave transmitted from the portable terminal. When the phase data acquired by the terminal acquisition unit matches the phase data acquired by the device acquisition unit, the determination unit determines that the portable terminal validly communicates with the communication device.

BRIEF DESCRIPTION OF DRAWINGS

Objects, features and advantages of the present disclosure will become apparent from the following detailed description made with reference to the accompanying drawings. In the drawings:

FIG. 9 is a flowchart showing a receiving process of the in-vehicle device of a second embodiment.

DESCRIPTION OF EMBODIMENTS

Figure 1:
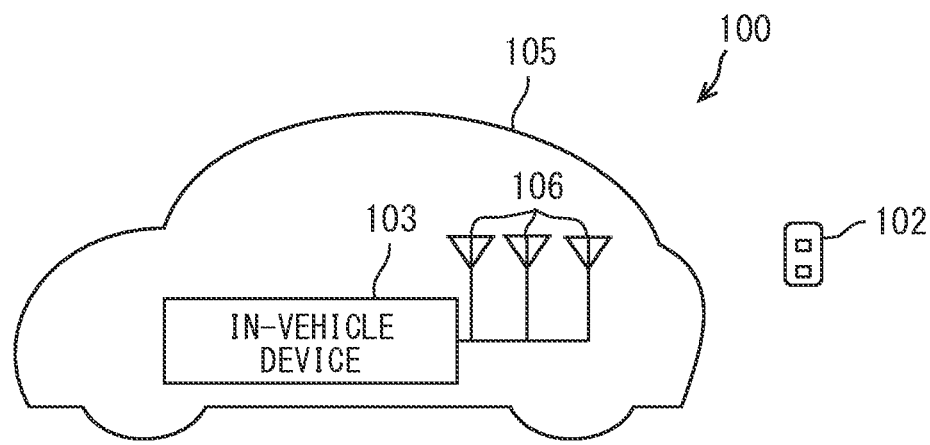
FIG. 1 is a diagram showing an in-vehicle system.

In known RKE systems, the in-vehicle device periodically wirelessly transmits a request signal. When a user's portable terminal approaches the vehicle, the portable terminal returns an answer signal in response to the request signal, and the in-vehicle device authenticates the portable terminal based on the answer signal. Then, the portable terminal is able to lock or unlock the vehicle according to the authentication.

Relay attack is known as a method for stealing a vehicle using the RKE system. The relay attack is a method for illegally unlocking a vehicle by relaying the request signal using a repeater to the user's portable terminal, which is away from the vehicle, thereby forcing the portable terminal to transmit the answer signal. As a countermeasure against such relay attack, there is a method of measuring distance between the in-vehicle device and the portable terminal. When the distance is greater than a predetermined value, vehicle control via communication is prohibited.

For measuring the distance between the in-vehicle device and the portable terminal, there is a method using phase difference during communication. In such method, when the in-vehicle device and the portable terminal communicate with each other at multiple frequencies, a phase at each of the multiple frequencies during the communication is detected, and the distance is estimated by the phase difference between frequencies.

When using the phase difference, it is necessary to consider an influence caused by reflection on the vehicle and the ground. Such influence is known as multipath. For removing the multipath, the observed waveform is decomposed by arrival time and the radio wave at the earliest arrival time is used as a direct wave. There is a problem that the distance cannot be measured correctly when the radio wave generator is placed close to the target of distance measuring. For example, a radio wave generator is installed between the in-vehicle device and the portable terminal and a radio wave with a faster arrival time than the portable terminal is created. When the in-vehicle device mistakenly detects that the radio wave is a direct wave, the distance measurement value may be calculated incorrectly.

The present disclosure discloses a security system including a portable terminal, a communication device communicating with the portable terminal, and a determination unit determining validity of the portable terminal. The portable terminal includes: a terminal communication unit transmitting a distance measuring radio wave for distance measuring purpose at a specific frequency and receiving a distance measuring radio wave transmitted from the communication device at the specific frequency; a terminal control unit controlling the terminal communication unit; and a terminal acquisition unit acquiring phase data from the distance measuring radio wave transmitted from the communication device when the terminal communication unit receives the distance measuring radio wave transmitted from the communication device.

The communication device includes: a device communication unit transmitting the distance measuring radio wave at the specific frequency and receiving the distance measuring radio wave at the specific frequency from the portable terminal; a device control unit controlling the device communication unit; and a device acquisition unit acquiring phase data from the distance measuring radio wave transmitted from the portable terminal when the device communication unit receives the distance measuring radio wave transmitted from the portable terminal. When the phase data acquired by the terminal acquisition unit matches the phase data acquired by the device acquisition unit, the determination unit determines that the portable terminal validly communicates with the communication device.

By using the above-described security system, the validity of communication between the portable terminal and the communication device is determined using the phase data. The received phase data of the distance measuring radio waves vary according to the distance from a transmission source. When the communication device and the portable terminal are fixed and the communication device and the portable terminal have transmitted and received distance measuring radio waves having the same specific frequency, phase data of the distance measuring radio waves received by the communication device are identical to phase data of the distance measuring radio waves received by the portable terminal. The phase data is also referred to as polar form data or IQ data. The polar form data (polar coordinate format) is a time-series signal represented by a time function of a sinusoidal amplitude, frequency, and phase. For example, when a radio wave generator is installed between the communication device and the portable terminal, the phase data of the distance measuring radio wave received by the communication device from the radio wave generator does not match the phase data of the distance measuring radio wave acquired by the portable terminal from the communication device. Therefore, it is possible to prevent the relay attack caused by the radio wave generator. By using bidirectional phase data, the validity of the communication between the communication device and the portable terminal can be determined with good precision.

The following describes embodiments for carrying out the present disclosure with reference to the drawings. In each embodiment, a part corresponding to the part described in the preceding embodiment may be denoted by the same reference symbol or a reference symbol with one character added to the preceding reference symbol; thereby, redundant explanation may be abbreviated.

In each embodiment, when only part of the configuration is described, the other part of the configuration can be the same as that in the preceding embodiment. The present disclosure is not limited to combinations of embodiments which combine parts that are explicitly described as being combinable. The various embodiments may be partially combined with each other even if not explicitly described.

First Embodiment

The following describes a first embodiment according to the present disclosure with reference to FIG. 1 to FIG. 8. The in-vehicle system 100 includes an in-vehicle device 103 mounted on a vehicle 105, and a portable device 102 carried by a user of the vehicle 105. The portable device 102 is linked with the in-vehicle device 103, and has a function as a unique key to the vehicle 105. The in-vehicle device 103 and the portable device 102 each have a function for implement the remote keyless entry system.

The portable device 102 includes multiple terminal switches 23 to be operated by the user, and transmits an instruction signal, to the in-vehicle device 103, corresponding to one of the terminal switches 23 operated by the user. Upon receiving the instruction signal transmitted from the portable device 102, the in-vehicle device 103 controls the vehicle according to the received instruction signal. For example, the in-vehicle device 103 controls a locking state of a door of the vehicle according to the instruction signal transmitted from the portable device 102.

The in-vehicle device 103 and the portable device 102 is configured to implement a smart entry system by carrying out wireless communication using radio waves at a predetermined frequency band with each other. Specifically, the in-vehicle device 103 is configured to transmit signals toward the vehicle interior and a predetermined range around the vehicle 105, and receive a signal transmitted from the portable device 102. The portable device 102 is configured to receive a signal transmitted from the in-vehicle device 103 and return a predetermined signal to the in-vehicle system 100.

In this regard, when the portable device 102 is in a collation area, the in-vehicle device 103 executes collation by wireless communication with the portable device 102, and when the collation is established, various controls to lock the doors, start the engine, and the like are executed. The collation process is a process in which the in-vehicle device 103 authenticates that a communication terminal, performing wireless communication with itself, is a valid portable device 102 linked with the in-vehicle device 103.

When the in-vehicle device 103 authenticates that the portable device 102 exists in the collation area of the in-vehicle device 103 via wireless communication, the user carrying the portable device 102 is able to lock and unlock the door, start and stop the engine, and operate the portable device 102 without operating the portable device 102.

Figure 2:
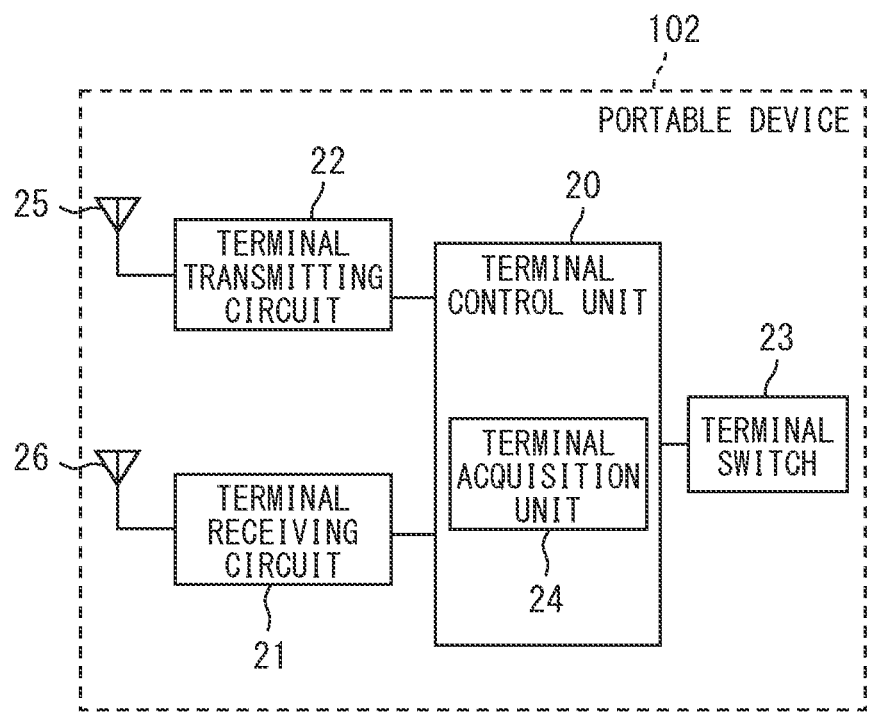
FIG. 2 is a block diagram showing a portable device.

Next, the portable device 102 will be described with reference to FIG. 2. The portable device 102 includes a terminal receiving circuit 21, a terminal transmitting circuit 22, and a terminal control unit 20. The portable device 102 further includes a terminal receiving antenna 26, a terminal transmitting antenna 25, and at least one of the multiple terminal switches 23.

The terminal receiving circuit 21 and the terminal transmitting circuit 22 function as a terminal communication unit, and perform data transmission and reception with another device, for example, the in-vehicle device 103. The terminal receiving circuit 21 receives a signal from another device using the terminal receiving antenna 26 of the portable device 102, and transmits the received signal to the terminal control unit 20. The terminal transmitting circuit 22 is controlled by the terminal control unit 20 and transmits a predetermined signal to another device using the terminal transmitting antenna 25.

The terminal receiving antenna 26 is an antenna for receiving radio waves. The terminal receiving antenna 26 is connected to the terminal receiving circuit 21, converts the received radio waves into an electric signal, and outputs the converted radio waves to the terminal receiving circuit 21.

The terminal receiving circuit 21 extracts the data in the received signal by performing predetermined processing, such as analog-to-digital conversion, demodulation, and decoding, to the signal input from the terminal receiving antenna 26. The terminal receiving circuit 21 transmits the extracted data to the terminal control unit 20. When the terminal receiving circuit 21 receives distance measuring radio waves for distance measuring purpose, the terminal receiving circuit 21 transmits the received data to the terminal control unit 20.

The terminal switches 23 are switches for the user to use function, such as a keyless entry system. The portable device 102 is equipped with switches (i.e., the terminal switches 23) for locking and unlocking all doors. When the user presses the various switches, a control signal, indicating that the switch has been pressed, is output to the terminal control unit 20.

When receiving control signal input from the terminal switches 23, the terminal control unit 20 detects that a user operation has been performed to control locking state, such as locking or unlocking the various doors on vehicle 105, and specifies the content of such instruction.

The terminal control unit 20 mainly include a microcomputer equipped with a CPU, a RAM, a ROM, an I/O, and the like. The ROM stores control program in order to function a general microcomputer as the terminal control unit 20.

The terminal control unit 20 executes the process in the portable device 102 for implementing the smart entry system or the like by running the control program stored in the ROM by the CPU. In addition to the control program, the ROM stores a terminal ID that is unique identification information of the portable device 102. The terminal control unit 20 performs collation using, for example, the terminal ID and a vehicle ID. For example, a predetermined terminal ID is linked with a predetermined vehicle ID in advance on a one-to-one basis, and when the IDs are acquired, the collation is conducted to determine whether or not the IDs are linked.

The terminal control unit 20 generates a signal to be transmitted to the in-vehicle device 103 and outputs the signal to the terminal transmitting circuit 22. For example, when the terminal receiving circuit 21 receives a signal (i.e., a request signal for collation) transmitted by the in-vehicle device 103, the terminal receiving circuit 21 generates a predetermined signal (i.e., a response signal) to be transmitted as a response to the received signal, and transmits the predetermined signal to the terminal transmitting circuit 22.

When the control signal indicating the terminal switch 23 pressed by the user is an input signal, the instruction signal is generated to control the vehicle corresponding to the terminal switch 23, which outputs the control signal. For example, when the switch for unlocking all the doors is pressed, an instruction signal instructing to unlock all the doors is generated and output to the terminal transmitting circuit 22.

The terminal control unit 20 includes a terminal acquisition unit 24 as a functional block. When the terminal acquisition unit 24 receives the distance measuring radio waves, it acquires phase data from the received data of the distance measuring radio waves. The distance measuring radio waves are measurement data for estimating the distance between the in-vehicle device 103 and the portable device 102. The distance measuring radio waves are transmitted from the in-vehicle device 103. The terminal control unit 20 controls the terminal transmitting circuit 22 so as to transmit the acquired phase data to the in-vehicle device 103.

The phase data is also known as, for example, polar form data or IQ data. The phase data refers to polar form data (polar coordinate format) when a time series signal is represented by a time function of sinusoidal amplitude, frequency, and phase. For example, the phase data is expressed by the following numerical expression (1).

$$A(t) \cdot \cos(2\pi f(t) \cdot t + \varphi(t)) \tag{1}$$

Here, A (t) is an amplitude of sine wave, f (t) is frequency, and φ (t) is phase, which are all functions of time t. The sine wave represented in the numerical expression (1) can be represented in polar form using a complex number (I+jQ).

The terminal control unit 20 controls the terminal transmitting circuit 22 so as to transmit the distance measuring radio wave with a specific frequency when transmitting phase data. The phase of the distance measuring radio wave is set to a predetermined value, for example, 0, in advance. The predetermined value is also the same as a predetermined value of the in-vehicle device 103 as described later. The specific frequency of the distance measuring radio wave is set to be a predetermined specific frequency at a predetermined timing associated with the in-vehicle device 103. For example, when the in-vehicle device 103 and the portable device 102 are time synchronized, the distance measuring radio wave at a specific frequency is transmitted at a predetermined specific timing corresponding to a timing for transmitting the distance measuring radio wave. For example, the first time band t1 and the first frequency f1 correspond to each other, and the second time band t2 and the second frequency f2 after the first time band t1 correspond to each other. When the specific frequencies are different depending on the time bands, the distance measuring radio waves are generated at multiple of the different specific frequencies and transmitted to the in-vehicle device 103.

The terminal transmitting circuit 22 converts a baseband signal from the terminal control unit 20 into a carrier signal by a predetermined process such as coding, modulation, and digital to analog conversion. The terminal transmitting circuit 22 outputs the carrier signal to the terminal transmitting antenna 25. The terminal transmitting antenna 25 converts the input signal into radio wave and radiates the radio wave into space. The terminal transmitting circuit 22 transmits the distance measuring radio wave at the specific frequency generated by the terminal control unit 20.

Figure 3:
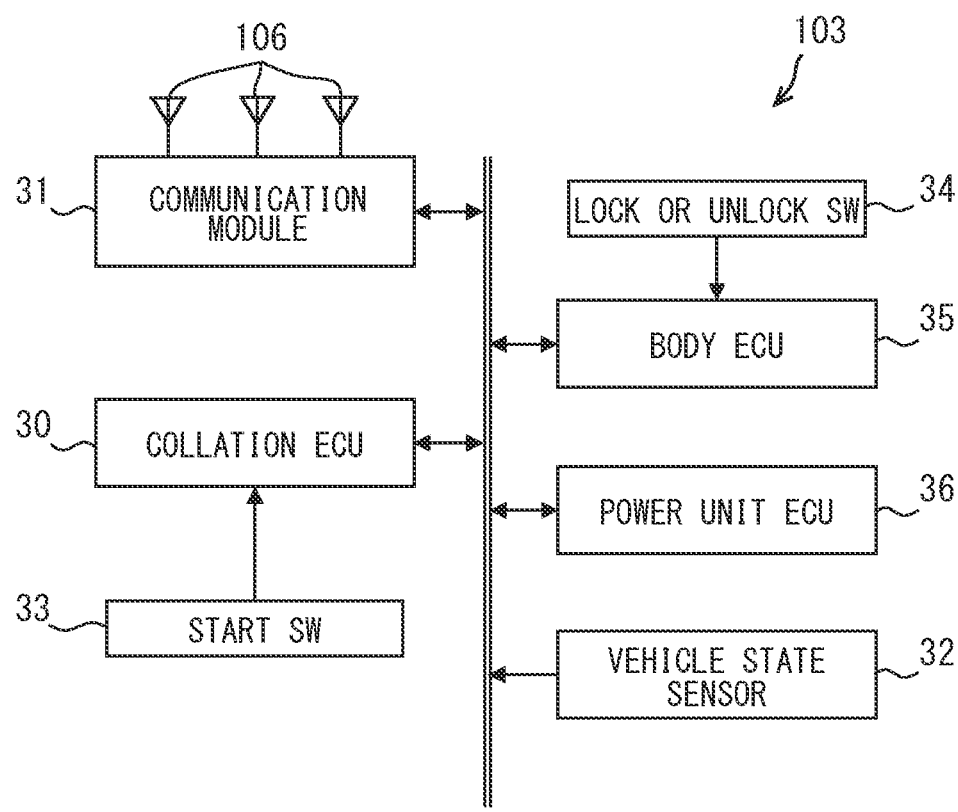
FIG. 3 is a block diagram showing an in-vehicle device.

Next, the in-vehicle device 103 will be described with reference to FIG. 3. The in-vehicle device 103 has a communication function for communicating with another device, for example, the portable device 102, such that the in-vehicle device 103 can operate as a communication device. The in-vehicle device 103 executes various processes for implementing the smart entry system or the keyless entry system. The in-vehicle device 103 includes a collation ECU (Electronic Control Unit) 30, a vehicle communication module 31, a vehicle state sensor 32, a start switch (hereinafter, start SW) 33, a locking or unlocking switch (hereinafter, locking or unlocking SW) 34, a body ECU 35, and a power unit ECU 36.

The vehicle communication module 31 is an in-vehicle communication module. The vehicle communication module 31 functions as a device communication unit that communicates with the portable device 102. By connecting the vehicle communication module 31 to a network, it is also possible to communicate via a cloud system. The vehicle communication module 31 includes a DCM (Data Communication Module). The vehicle communication module 31 includes a memory, and for example, the vehicle ID may be stored in the memory in advance. Then, the vehicle communication module 31 is configured to transmit, for example, the vehicle ID stored in the memory to a communication connection destination when establishing the communication.

The vehicle communication module 31 is connected to multiple, at least three, vehicle-mounted antennas 106. In the present embodiment, the vehicle communication module 31 is connected to three vehicle-mounted antennas 106. The three vehicle-mounted antennas 106 are mounted at different positions of the vehicle 105, for example, a left portion, a front portion, and a right portion, respectively. In the present embodiment, the three vehicle-mounted antennas 106 are connected to the vehicle communication module 31, but the configuration is not limited. The in-vehicle device 103 may be configured to have three vehicle communication modules 31 and each of the vehicle communication modules 31 has the vehicle-mounted antenna 106.

The vehicle-mounted antenna 106 converts the input signal into the radio wave and radiates the radio wave into space. The vehicle-mounted antenna 106 receives the radio wave and converts the received radio wave into an electrical signal. The converted electric signal is output to the vehicle communication module 31.

The vehicle-mounted antenna 106 is, for example, a transmitting or receiving antenna, but may be configured to have a transmitting antenna and a receiving antenna separately. For convenience, the vehicle-mounted antenna 106 may perform short range wireless communication according to short range wireless communication standards such as Wi-Fi (registered trademark), which is used as a standard in multifunctional cellphones. One of the three vehicle-mounted antennas 106 transmits and receives the distance measuring radio wave. In this regard, a distance travelled by the received distance measuring radio wave is the same as a distance travelled by the transmitted distance measuring radio wave.

The vehicle communication module 31 converts a baseband signal from the collation ECU 30 to the carrier signal by a predetermined processing such as coding, modulating, and digital to analog conversion. Then, the vehicle communication module 31 outputs the carrier signal generated based on the baseband signal to the vehicle-mounted antenna 106 and radiates the carrier signal as a radio wave.

The vehicle communication module 31 extracts the data in the received signal by performing predetermined processing, such as analog to digital conversion, demodulation, and decoding, to the signal input from the vehicle-mounted antenna 106. Then, the vehicle communication module 31 transmits the extracted data to the collation ECU 30.

The vehicle state sensor 32 is a sensor group that detects various information related to the vehicle 105, such as a traveling state and an operation state. Examples of the vehicle state sensor 32 include a vehicle speed sensor that detects a speed of the vehicle, a shift position sensor that detects a shift position, and the like.

The start SW 33 is a switch requesting start of a traveling drive source of the vehicle. The start SW 33 is provided, for example, in front of the driver's seat. Regarding the start SW 33, for example, it can be a mechanical button switch.

The locking or unlocking SW 34 is a switch requesting locking or unlocking of vehicle doors of the vehicle, such as a driver's seat door, a passenger seat door, and a trunk room door. The locking or unlocking SW 34 is provided, for example, on the outer door handle of each of the driver's seat and passenger's seat. The locking or unlocking SW 34 is provided on the trunk room door, for example, a rear bumper. The locking or unlocking SW 34, may use, for example, a touch switch or a mechanical button switch.

The body ECU 35 locks and unlocks each door of the vehicle by outputting a driving signal for controlling locking and unlocking of each door of the vehicle to a door lock motor provided in each vehicle door. The body ECU 35 outputs a lock signal to a door lock motor to lock the door. The body ECU 35 outputs an unlock signal to the door lock motor to unlock the door. The locking or unlocking SW 34 for each door of the vehicle is connected to the body ECU 35. The body ECU 35 acquires the signal from the locking or unlocking SW 34 and detects the operation on the locking or unlocking SW 34.

The power unit ECU 36 is an electronic control device that controls the traveling drive source such as an internal combustion engine or a motor generator of the vehicle. When the power unit ECU 36 obtains a start permission signal for the traveling drive source from the collation ECU 30, the power unit ECU 36 starts the traveling drive source of the vehicle. The power unit ECU 36 also functions as an ECU that executes a process of supporting the driving operation of an occupant seated in the driver's seat.

The collation ECU 30 includes, for example, a processor, a memory, an I/O, and a bus that connects those devices, and executes various processes related to the authentication for permitting the user to use the subject vehicle by executing a control program stored in the memory. The memory here is a non-transitory tangible storage medium that stores computer readable programs and computer readable data. The non-transitory tangible storage medium is implemented by a semiconductor memory, a magnetic disk, or the like. The collation ECU 30 executes a vehicle related process for implementing the smart entry system or the like by running the various programs on the CPU.

Figure 4:
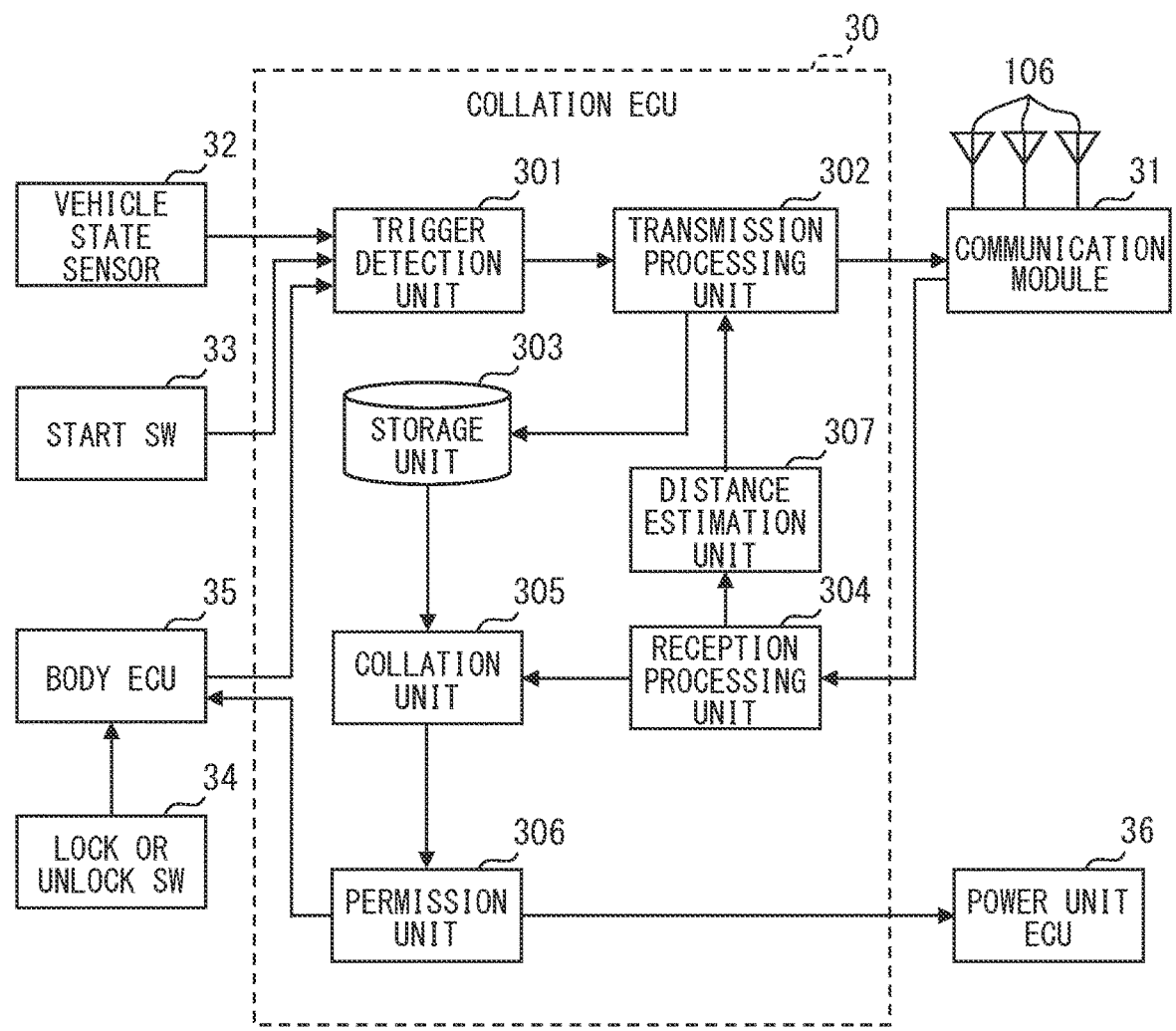
FIG. 4 is a block diagram showing a collation ECU.

The following will describe an example of a schematic configuration of the collation ECU 30 with reference to FIG. 4. As shown in FIG. 4, the collation ECU 30 includes a trigger detection unit 301, a transmission processing unit 302, a storage unit 303, a reception processing unit 304, a collation unit 305, a permission unit 306, and a distance estimation unit 307 as functional blocks. This collation ECU 30 corresponds to the in-vehicle device 103. In addition, partial or all of the functions executed by the collation ECU 30 may be configured as a hardware, such as one or more of ICs or the like. Alternatively, the partial or all of functions executed by the collation ECU 30 may be implemented by a combination of hardware manner and software manner which adopts a processor to execute the functions.

The reception processing unit 304 receives the response signal transmitted from the portable device 102 via the vehicle communication module 31. The reception processing unit 304 acquires phase data (hereinafter, may be referred to as "vehicle acquisition phase data") from the distance measuring radio wave transmitted from the portable device 102. The reception processing unit 304 transmits the acquired vehicle acquisition phase data to the distance estimation unit 307 and the collation unit 305. Therefore, the reception processing unit 304 also functions as a device acquisition unit that acquires phase data from the distance measuring radio wave.

The reception processing unit 304 transmits the terminal acquisition phase data to the collation unit 305, when the response signal from the portable device 102 includes the phase data of the distance measuring radio wave, which is received by the portable device 102 (known as "terminal acquisition phase data"). Therefore, there are two types of phase data transmitted to the collation unit 305, including the terminal acquisition phase data acquired by the terminal acquisition unit 24 from the distance measuring radio wave transmitted by the in-vehicle device 103, and the vehicle acquisition phase data acquired by the reception processing unit 304 from the distance measuring radio wave transmitted by the portable device 102.

The distance estimation unit 307 calculates the distance to the portable device 102 from the multiple vehicle acquisition phase data at different specific frequencies received by the vehicle-mounted antenna 106. The distance estimation unit 307 calculates the distance to the portable device 102 using the multiple vehicle acquisition phase data received from the reception processing unit 304, for example, one of the vehicle acquisition phase data and a different one of the vehicle acquisition phase data. Specifically, the distance estimation unit 307 generates at least two sets of combinations of the phase data of the distance measuring radio waves at one of the multiple different specific frequencies and the phase data of the distance measuring radio wave at a different one of the multiple specific frequencies, and estimates the distance for each of the at least two sets of combinations, based on phase difference between the phase data at one of the multiple different specific frequencies and the phase data at the different one of the multiple different specific frequencies, determined respectively in each of the at least two sets of combinations. The distance estimation unit 307 for example, optimizes the multiple acquired vehicle acquisition phase data to estimate the distance. The distance estimation unit 307 estimates the distance using the MUSIC (MUltiple SIgnal Classification) method as distance estimation algorithm. The distance estimation unit 307 adopts the estimated distance when the difference in distance for each combination of specific frequencies is within a predetermined range, and does not adopt the estimated distance the estimated distance when the difference is out of the predetermined range.

The transmission processing unit 302 transmits a request signal for collation via the vehicle communication module 31. The transmission processing unit 302 generates multiple distance measuring radio waves for distance measuring purpose at multiple different specific frequencies, and transmits the multiple distance measuring radio waves via the vehicle communication module 31. The method of determining the specific frequency in the in-vehicle device 103 is the same as the method of determining the specific frequency in the portable device 102 as described above.

The storage unit 303 may be provided by an electrically rewritable non-volatile memory, and stores information, for example, vehicle ID. The storage unit 303 stores various programs and the like for implementing a smart entry system and the like.

The collation unit 305 functions as a determination unit for determining whether or not the portable device 102 is a preset valid portable device 102 using communication with the portable device 102. Specifically, the collating unit 305 receives the response signal as a response to the request signal via the vehicle communication module 31, and collates the portable device 102 by collating the ID in the response signal. The collation is performed between the terminal ID included in the response signal received from the portable device 102 and the vehicle ID stored in the storage unit 303. When the collation is successful, the next authentication using the phase data will be performed.

Specifically, the collation unit 305 uses the phase data to determine whether or not the response signal has been transmitted from the valid portable device 102. The collation unit 305 determines whether or not the vehicle acquisition phase data matches the terminal acquisition phase data at the same specific frequency. In the present disclosure, match between the vehicle acquisition phase data and the terminal acquisition phase data indicates that the vehicle acquisition phase data substantially identical to the terminal acquisition phase data with consideration of allowable error. In this regard, the collation unit 305 determines that the portable device 102 is a valid portable device. The above establishes the authentication.

The trigger detection unit 301 detects a trigger related to use of the subject vehicle. The use of the subject vehicle includes opening door of the vehicle for the user to get on, starting the subject vehicle, opening door of trunk room, and the like.

A trigger relating to opening the door of the vehicle for the user to get on (hereinafter referred to as a boarding trigger) may be detected as follows. The trigger detection unit 301 detects the boarding trigger when parking of the subject vehicle is determined based on the detection result of the vehicle state sensor 32, and locking or unlocking SW 34 of the door for driver seat or the door for passenger seat is detected. Parking of the subject vehicle may be determined, for example, from the fact that the shift position detected by the shift position sensor is the parking position. Parking of the vehicle may also be determined based on the vehicle speed detected by the vehicle speed sensor. For example, when a value of the vehicle speed indicates parking of the vehicle, the parking of the vehicle is determined. The operation on the locking or unlocking SW 34 may be detected from the signal of the locking or unlocking SW 34.

A trigger relating to starting the subject vehicle (hereinafter referred to as a starting trigger) may be detected as follows. The trigger detection unit 301 detects the starting trigger when it detects the start SW 33. The operation on the start SW 33 may be detected from the signal of the start SW 33.

A trigger relating to opening the door of the trunk room (hereinafter referred to as a trunk opening trigger) may be detected as follows. The trigger detection unit 301 detects the trunk opening trigger when the parking of the subject vehicle is determined based on the detection result of the vehicle state sensor 32, and the operation on the locking or unlocking SW 34 of the door of the trunk room is detected.

Based on the authentication result of the collation unit 305, the permission unit 306 functions as a device control unit, which permits using of the vehicle 105 when the portable device 102 is valid, and prohibits using of the vehicle 105 when the portable device 102 is invalid. The permission unit 306 transmits an unlock signal to the door lock motors of all of the vehicle doors to unlock all of the vehicle doors, when the trigger detection unit 301 detects the boarding trigger and when the collation unit 305 establishes the authentication.

When the trigger detection unit 301 detects the starting trigger and when the collation unit 305 establishes the collation, the permission unit 306 starts the traveling drive source by transmitting the start permission signal of the traveling drive source to the power unit ECU 36. The permission unit 306 transmits the unlock signal to the trunk room door to unlock the trunk room door, when the trigger detection unit 301 detects the trunk opening trigger and when the collation unit 305 establishes the collation. In this case, only the trunk room door is configured to be unlocked.

When there is no signal from the valid portable device 102, the permission unit 306 prohibits using of the function of the vehicle 105 based on the result of the authentication of the collation unit 305. This is to prevent unauthorized use of the vehicle 105.

Figure 5:
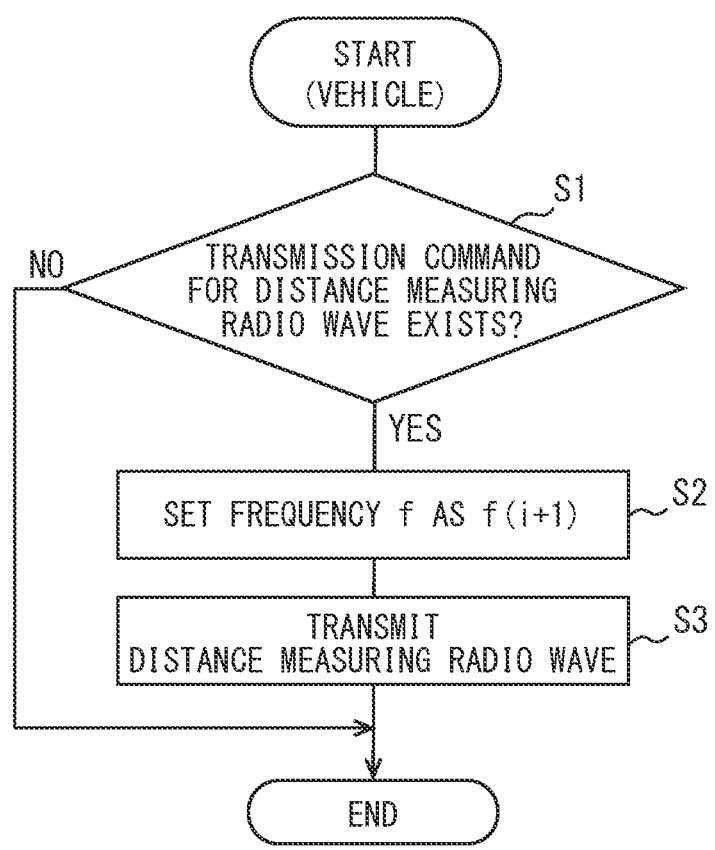
FIG. 5 is a flowchart showing a transmission process of the in-vehicle device.

The collation process for collating the portable device 102 will be described with reference to FIGS. 5 to 8. The flow in FIG. 5 is repeatedly executed in a short period by the collation ECU 30 of the in-vehicle device 103. In step S1, the collation process determines whether or not there is a transmission command of the distance measuring radio wave. When the transmitting command exists, step S2 is executed, and when the transmission command does not exists, the process ends. The transmission command is, for example, a command transmitted from other devices or a command transmitted periodically.

In step S2, frequency of the distance measuring radio wave to be transmitted is determined, and step S3 is executed. Multiple frequencies f, for example, k frequencies are set in advance. Herein, k indicates the number of frequencies. The multiple frequencies f are determined from f(1) to f(k) according to a determination rule predetermined with the portable device 102. In step S3, the distance measuring radio wave at the frequency set in step S2 is transmitted, and the process ends.

Figure 6:
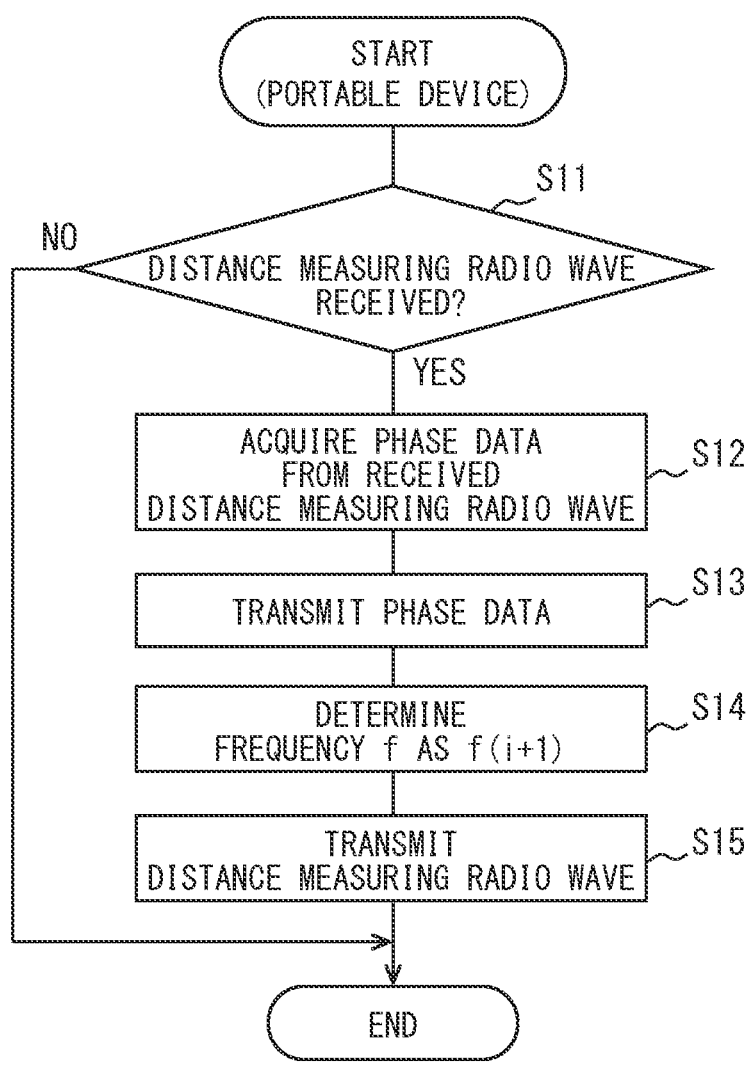
FIG. 6 is a flowchart showing a processing of the portable device.

Next, process of the portable device 102 will be described. The process described in FIG. 6 is repeatedly executed in a short period by the terminal control unit 20 of the portable device 102. In step S11, whether or not the distance measuring radio wave has been received is determined. When the distance measuring radio wave has been received, step S12 is executed, and when the distance measuring radio wave has not been received, the process ends.

In step S12, since the distance measuring radio wave is received, the phase data is acquired as the terminal acquisition phase data from the distance measuring radio wave, and step S13 is executed. In step S13, the terminal acquisition phase data is transmitted to the in-vehicle device 103, and step S14 is executed.

In step S14, frequency of the distance measuring radio wave to be transmitted is determined, and step S15 is executed. The frequency f is determined from f(1) to f(k) according to the determination rule as described above. Therefore, the specific frequency of the received distance measuring radio wave is the same as the specific frequency of the distance measuring radio wave to be transmitted. In step S15, the distance measuring radio wave at the frequency set in step S2 is transmitted, and the process ends.

As described above, when the portable device 102 receives the distance measuring radio wave, the portable device 102 acquires the phase data and transmits the distance measuring radio wave at the specific frequency together with the acquired phase data.

Figure 7:
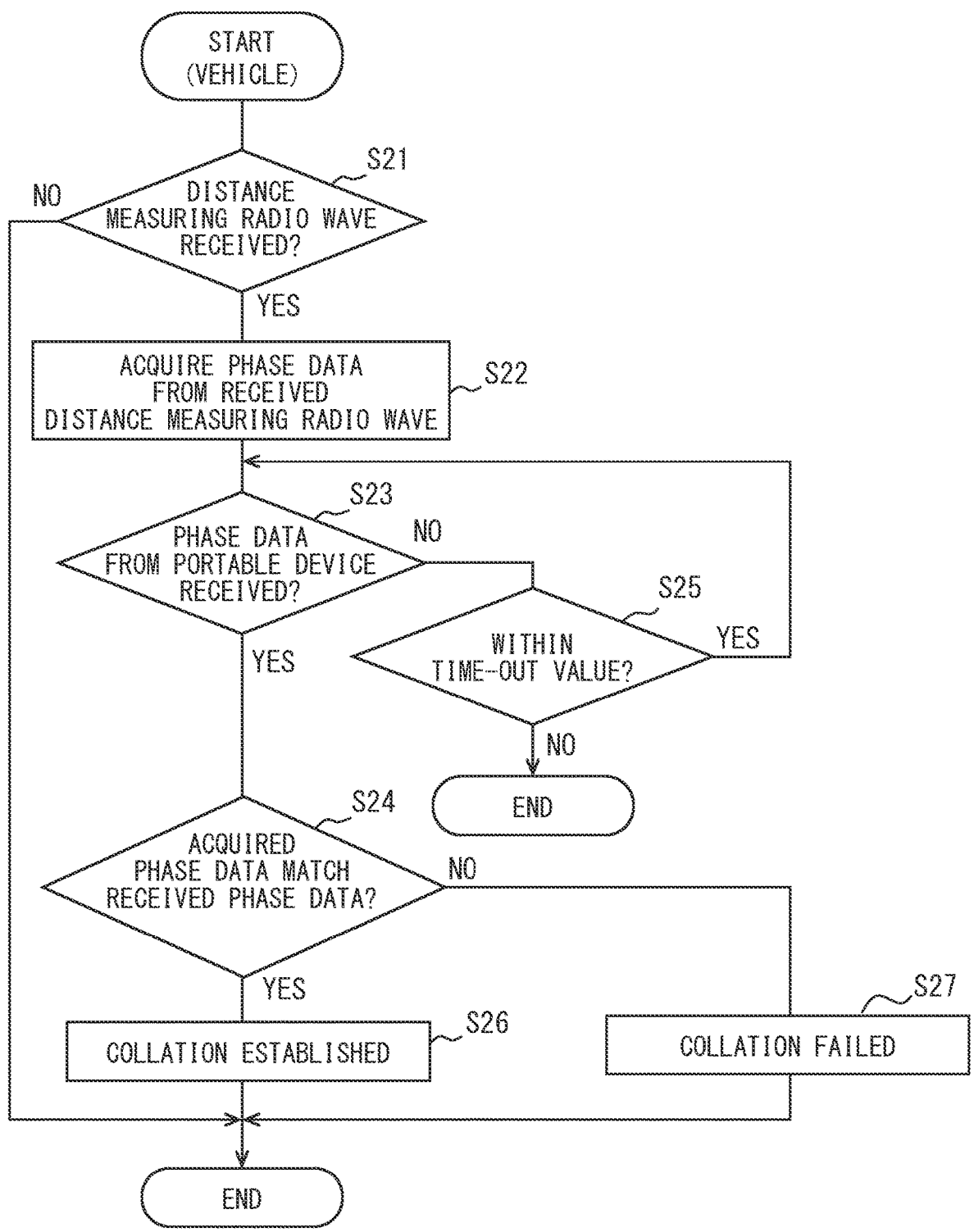
FIG. 7 is a flowchart showing a receiving process of the in-vehicle device.

A process of the in-vehicle device 103 will be described. The process described in FIG. 7 is repeatedly executed in a short period by the collation ECU 30 of the in-vehicle device 103. In step S21, whether or not the distance measuring radio wave has been received is determined. When the distance measuring radio wave has been received, step S22 is executed, and when the distance measuring radio wave has not been received, the process ends.

In step S22, since the distance measuring radio wave is received, the phase data is acquired as the vehicle acquisition phase data from the distance measuring radio wave, and step S23 is executed. In step S23, whether or not the terminal acquisition phase data from the portable device 102 has been received is determined. When the terminal acquisition phase data has been received, step S24 is executed, and when the terminal acquisition phase data has not been received, step S25 is executed. In step S25, whether or not a waiting time is within a time-out value is determined. When the waiting time is within the time-out value, the process returns to the step S23, and when the waiting time exceeds the time-out value, the process ends. When the waiting time exceeds the time-out value, the process determines that the portable device 102 has not responded to the transmitted distance measuring radio wave.

In step S24, whether or not the acquired vehicle acquisition phase data matches the received terminal acquisition phase data is determined. When matching, step S26 is executed, and when not matching, step S27 is executed. The step S24, not only determines the match between the phase data at one specific frequency, but also determines the match between the phase data at all of the multiple specific frequencies. Therefore, in this case, the vehicle acquisition phase data and the terminal acquisition phase data are compared for each of the multiple specific frequencies. When the vehicle acquisition phase data and the terminal acquisition phase data match at all of the multiple specific frequencies, step S26 is executed. When the phase data do not match, step S27 is executed.

In step S26, since the acquired vehicle acquisition phase data matches the received terminal acquisition phase data, the process determines that the communication source is the valid portable device 102, and the process ends. Which is to say, the process determines that the collation is established. In step S27, since the acquired vehicle acquisition phase data does not match the received terminal acquisition phase data, the process determines that the communication source is not the valid portable device 102, and the process ends. Which is to say, the process determines that the collation is not established.

Figure 8:
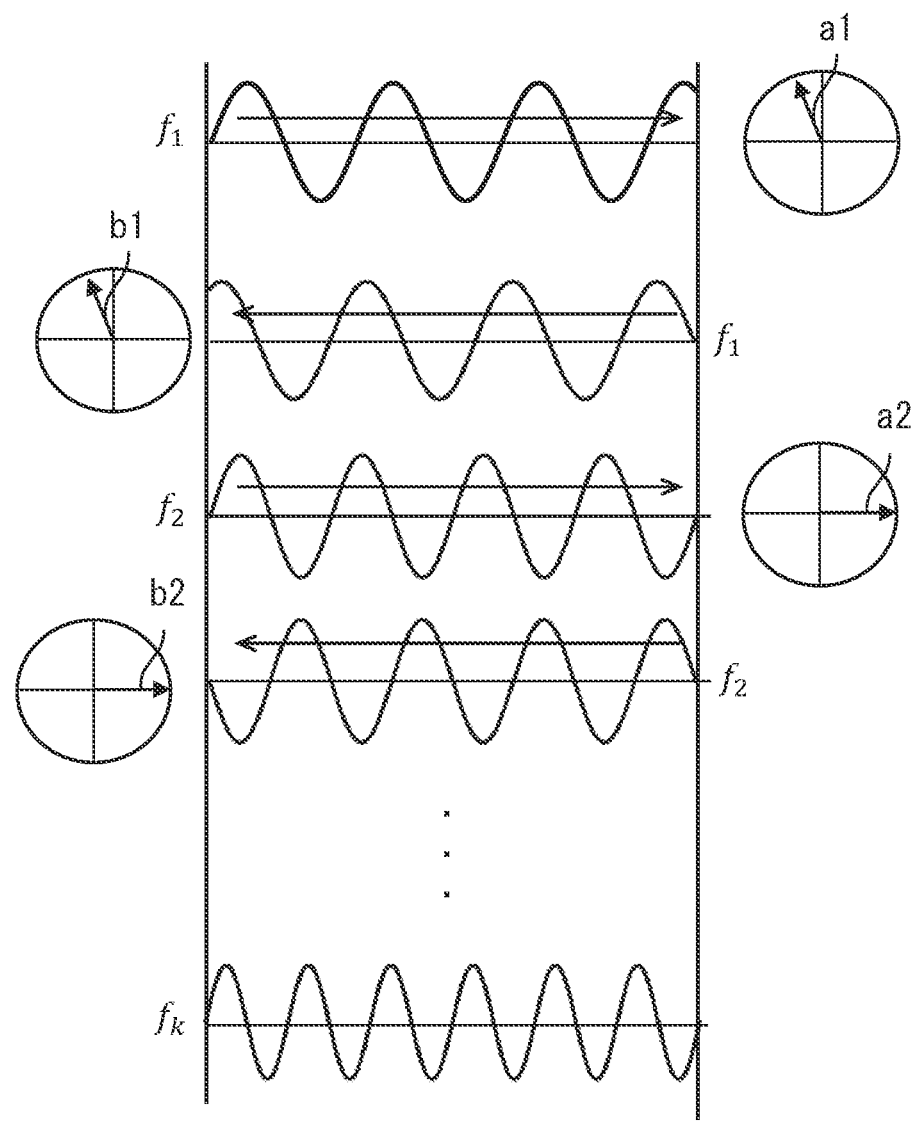
FIG. 8 is a diagram illustrating transmission and reception of distance measuring radio waves at multiple specific frequencies.

Specifically, in step S26, as shown in FIG. 8, the phase data may be acquired and determined at the multiple specific frequencies. For example, when a distance measuring radio wave at a first frequency f1 is transmitted from the in-vehicle device 103 to the portable device 102, the portable device 102 acquires phase data including phase a1 from the received distance measuring radio wave. Then, when the same distance measuring radio wave at the first frequency f1 is transmitted from the portable device 102 to the in-vehicle device 103 as response, the in-vehicle device 103 acquires phase data including phase b1 from the received distance measuring radio wave. When both of the in-vehicle device 103 and the portable device 102 are not moving, the distance does not change. With the same first frequency f1 and the same initial phase, the phase a1 of the terminal acquisition phase data and the phase b1 of the vehicle acquisition phase data are the same. Therefore, by comparing the phase data, it can be determined that, between the portable device 102 and the in-vehicle device 103, the distance travelled by the transmitted distance measuring radio wave and the distance travelled by the received distance measuring radio wave are the same. When the phase data of the transmitted and received distance measuring radio waves match, it can be determined that the device is the valid portable device 102. The phase data from the transmitted and received distance measuring radio waves are compared not only at the first frequency, but also at each of the second frequencies f2 to the k-th frequency fk, which are different from the first frequency f1. Here, k is a natural number, for example, with a maximum value of 80.

As described above, the in-vehicle system 100 of the present embodiment functions as a security system that authenticates the portable device 102 and determines the validity of the portable device. Then, the validity of the communication between the portable device 102 and the in-vehicle device 103 is determined using the phase data acquired from the distance measuring radio waves. The received phase data of the distance measuring radio waves vary according to the distance from a transmission source. When (i) the in-vehicle device 103 and the portable device 102 are fixed and (ii) the in-vehicle device 103 and the portable device 102 have transmitted and received distance measuring radio waves at same specific frequency, vehicle acquisition phase data and terminal acquisition phase data are the same. For example, when a radio wave generator is installed between the in-vehicle device 103 and the portable device 102, the phase data of the distance measuring radio waves received by the in-vehicle device 103 from the radio wave generator does not match the phase data of the distance measuring radio waves acquired by the portable device 102 from the in-vehicle device 103. Therefore, it is possible to prevent the relay attack caused by the radio wave generator. By using bidirectional phase data, the validity of the communication between the in-vehicle device 103 and the portable device 102 can be determined with good precision.

In the present embodiment, when the multiple distance measuring radio waves at the specific frequencies are used and the vehicle acquisition phase data match the terminal acquisition phase data at all of the multiple specific frequencies, the collation is determined to be established. Since the multiple specific frequencies are used, the validity can be judged more accurately.

Second Embodiment

The following describes a second embodiment according to the present disclosure with reference to FIG. 9. In the present embodiment, the validity of the portable device 102 is determined by estimating the distance. The process shown in FIG. 9, similar to the process in FIG. 7, is repeatedly executed in a short period by the collation ECU 30 of the in-vehicle device 103. In step S31, whether or not the distance measuring radio wave has been received is determined. When the distance measuring radio wave has been received, step S32 is executed, and when the distance measuring radio wave has not been received, the process ends.

In step S32, since the distance measuring radio wave is received, the phase data is acquired as the vehicle acquisition phase data from the distance measuring radio wave, and step S33 is executed. In step S33, whether or not the terminal acquisition phase data from the portable device 102 has been received is determined. When the terminal acquisition phase data has been received, step S34 is executed, and when the terminal acquisition phase data has not been received, step S35 is executed. In step S35, whether or not the waiting time is within the time-out value is determined. When the waiting time is within the time-out value, the process returns to the step S33, and when the waiting time exceeds the time-out value, the process ends. When the waiting time exceeds the time-out value, the process determines that the portable device 102 has not responded to the transmitted distance measuring radio wave.

In step S34, whether or not the acquired vehicle acquisition phase data matches the received terminal acquisition phase data is determined. When matching, step S36 is executed, and when not matching, step S39 is executed. Here, in step S34, the data to be compared is distance related data calculated from the phase data, rather than phase data. Specifically, the process determines whether or not the distance related data determined by a distance measuring algorithm using the terminal acquisition phase data matches the distance related data determined by the distance measuring algorithm using the vehicle acquisition phase data. The distance measuring algorithm is, for example, a generating algorithm that generates frequency spectrum reflecting the relationship between frequency and amplitude of the phase data. The distance related data is the frequency spectrum.

Since the two phase data match with each other in step S36, the distance can be estimated using the vehicle acquisition phase data, and step S37 is executed. The distance is estimated based on the phase included in the received phase data. Specifically, as shown in FIG. 8, the distance between the in-vehicle device 103 and the portable device 102 can be calculated based on phases acquired at multiple frequencies. For example, the distance may be calculated using a phase difference between a first frequency f1, which functions as a reference frequency, and each of a second frequency f2 to the k-th frequency fk. The second frequency to the k-th frequency are different from the first frequency f1. Here, k is a natural number, for example, with a maximum value of 80. The distance estimation unit 307 estimates the distance using at least two sets of combinations of the phase data of the distance measuring radio waves at the first frequency f1 and a different frequency, for example, the second frequency f2. Then, the distance is estimated based on the phase difference determined from the at least two sets of combinations of the phase data of the distance measuring radio waves. Each of the at least two sets of combinations includes the first frequency f1 and a different frequency, such as the second frequency f2 or the third frequency f3, and the like. For example, in FIG. 8, the distance is calculated using phase difference between the phase a1 of the first frequency f1 and a corrected phase a2 of the second frequency f2.

In step S37, the process determines whether or not the difference in distance is within the predetermined range. When the difference in distance is within the predetermined range, the process proceeds to step S8. When the difference in distance is out of the predetermined range, the process proceeds to step S9. In step S8, the distance is calculated corresponding to the first frequency, and is also calculated corresponding to a different frequency. That is, the distance is calculated for each of the at least two sets of combinations. When the calculated 79 distances are within the predetermined range, the calculation of distances are determined to be performed correctly. When one or more of the calculated distances are out of the predetermined range, the calculation of distances are determined to be performed incorrectly.

In step S38, since the acquired vehicle acquisition phase data matches the received terminal acquisition phase data and the distance is within the predetermined range, the communication source is determined to be the valid portable device 102. Then, the process ends. Which is to say, the collation is determined to be established. In step S39, since the acquired vehicle acquisition phase data does not match the received terminal acquisition phase data and the distance is out of the predetermined range, the communication source is determined to be an invalid portable device 102, and the process ends. Which is to say, the collation is not established. At this time, operation instructed by the portable device 102 to the vehicle 105 for control purpose may be refused with consideration of safety.

In the present embodiment, the distance estimation unit 307 uses at least two sets of combinations of the phase data at one of the specific frequency and the phase data at a different specific frequency, and estimates a distance between the portable device 102 and in-vehicle device 103 for each combination of the specific frequency based on phase difference determined for each combination. The collation unit 305 determines that the portable device 102 validly communicates with the in-vehicle device 103 and adopts the estimated distance, when (i) the difference in distances respectively calculated based on the at least two sets of combinations is within the predetermined range and (ii) the phase data acquired from the terminal matches with the phase data acquired from the vehicle at one or more of the specific frequencies. Therefore, since the distance is estimated using the phases of the multiple specific frequencies, estimation errors can be reduced and accuracy of estimation can be improved.

In the present embodiment, the match between the two phase data is determined based on respective distance related data. Since the distance related data are used instead of the phase data, the match of phase data may be determined when an intermediate data generated during the calculation process match with each other. Therefore, matching determination of phase data can be easily embedded to an existing or known distance calculation program using the phase difference.

OTHER EMBODIMENTS

Although some embodiments of the present disclosure have been described above, the present disclosure is not limited to the abovementioned embodiments, and various modifications are contemplated as exemplified below.

The structure of the abovementioned embodiment is merely an example, and the scope of the present disclosure is not limited to the above description. Several technical scopes of the present disclosure are indicated by descriptions in the claims and should be understood to include all modifications within the scope equivalent to the descriptions in the claims.

In the above-descried first embodiment, the collation unit 305 determines whether or not the two phase data match with each other. Such determination is not only based on the comparison of phase data itself. For example, related data generated by a specific algorithm using the phase data may be compared between the device and the terminal for the authentication purpose. The collation unit 305 determines whether or not related date generated from the phase data match between the device and the terminal. In other words, with the phase data as the initial data, intermediate data generated during the calculation process or the result data of the calculation process may be determined to be match with each other between the terminal and the device.

In the above-described first embodiment, the functions implemented by the collation ECU 30 or the terminal control unit 20 may implemented by hardware and software or a combination of the hardware and the software in different manner from the above-described configuration. The collation ECU 30 and the terminal control unit 20 may communicate with another control device, and another control device may execute a part or all of the process executed by the collation ECU and the terminal control unit. The collation ECU 30 or the terminal control unit 20 may be implemented by an electronic circuit, specifically, implemented by a digital circuit including multiple logic circuits or analog circuits.

In the above-described first embodiment, the security system is implemented by the in-vehicle device 103 and the portable device 102. However, the security system is not limited to such configuration. The security system may be configured in a different manner under a condition that the communication device can determine the validity of the portable device. The communication device may be any type of device having a communication function, and is not limited to the in-vehicle device 103. The portable terminal is not limited to the portable device 102. The portable terminal can be any portable device that functions as a key of the in-vehicle device 103. The portable terminal may be any type of device, such as a mobile phone, a smartphone, or a mobile terminal.

What is claimed is:

1. A security system comprising:
   a portable terminal;
   a communication device communicating with the portable terminal; and
   a determination unit determining validity of the portable terminal,
   wherein the portable terminal includes:
      a terminal communication unit transmitting a distance measuring radio wave for distance measuring purpose at a specific frequency and receiving a distance measuring radio wave transmitted from the communication device at the specific frequency;
      a terminal control unit controlling the terminal communication unit; and
      a terminal acquisition unit acquiring phase data from the distance measuring radio wave transmitted from the communication device when the terminal communication unit receives the distance measuring radio wave transmitted from the communication device,
   wherein the communication device includes:
      a device communication unit transmitting the distance measuring radio wave at the specific frequency and receiving the distance measuring radio wave at the specific frequency from the portable terminal;
      a device control unit controlling the device communication unit; and
      a device acquisition unit acquiring phase data from the distance measuring radio wave transmitted from the portable terminal when the device communication unit receives the distance measuring radio wave transmitted from the portable terminal, and
   wherein, when the phase data acquired by the terminal acquisition unit matches the phase data acquired by the device acquisition unit, the determination unit determines that the portable terminal validly communicates with the communication device.

2. The security system according to claim 1, wherein the determination unit determines that the phase data acquired by the terminal acquisition unit matches the phase data acquired by the device acquisition unit when distance related data determined by a distance measuring algorithm using the phase data acquired by the terminal acquisition unit matches distance related data determined by the distance measuring algorithm using the phase data acquired by the device acquisition unit.

3. The security system according to claim 1, wherein:
   the device communication unit transmits a plurality of distance measuring radio waves at a plurality of different specific frequencies to the portable terminal, and the plurality of different specific frequencies include the specific frequency;
   when the terminal communication unit receives each of the plurality of distance measuring radio waves transmitted from the communication device, the terminal communication unit transmits, to the communication device, the distance measuring radio wave at the specific frequency same with a frequency of the received distance measuring radio wave;

the determination unit compares the phase data received by the device communication unit with the phase data acquired by the device acquisition unit at each of the plurality of different specific frequencies; and when the phase data received by the device communication unit matches the phase data acquired by the device acquisition unit at all of the plurality of different specific frequencies, the determination unit determines that the portable terminal validly communicates with the communication device.

4. The security system according to claim 3, further comprising a distance estimation unit estimating a distance between the portable terminal and the communication device, wherein:

the distance estimation unit generates at least two sets of combinations of the phase data at one of the plurality of different specific frequencies and the phase data at a different one of the plurality of different specific frequencies, and estimates a distance between the portable terminal and the communication device for each of the at least two sets of combinations, based on phase difference between the phase data at one of the plurality of different specific frequencies and the phase data at the different one of the plurality of different specific frequencies, determined respectively in each of the at least two sets of combinations; and the determination unit determines that the portable terminal validly communicates with the communication device and adopts the estimated distance, when (i) a difference in distances respectively calculated based on the at least two sets of combinations is within a predetermined range and (ii) the phase data acquired by the terminal acquisition unit matches with the phase data acquired by the device acquisition unit at at least one of the plurality of different specific frequencies.

\* \* \* \* \*